United States Patent
Corley

(10) Patent No.: US 9,230,327 B2
(45) Date of Patent: Jan. 5, 2016

(54) POP-UP TEST REFERENCE IMAGE

(71) Applicant: Ferrand D. E. Corley, Mississauga (CA)

(72) Inventor: Ferrand D. E. Corley, Mississauga (CA)

( * ) Notice: Subject to any disclaimer, the term of this patent is extended or adjusted under 35 U.S.C. 154(b) by 316 days.

(21) Appl. No.: 13/986,756

(22) Filed: Jun. 3, 2013

(65) Prior Publication Data

US 2013/0335570 A1     Dec. 19, 2013

Related U.S. Application Data

(60) Provisional application No. 61/689,848, filed on Jun. 14, 2012.

(51) Int. Cl.
| | |
|---|---|
| *H04N 7/18* | (2006.01) |
| *G06K 9/00* | (2006.01) |
| *G06T 7/00* | (2006.01) |
| *G03B 43/00* | (2006.01) |
| *H04N 17/00* | (2006.01) |

(52) U.S. Cl.
CPC .............. *G06T 7/0018* (2013.01); *G03B 43/00* (2013.01); *H04N 17/002* (2013.01)

(58) Field of Classification Search
CPC ..... G06T 7/0018; G03B 43/00; H04N 17/002
See application file for complete search history.

(56) References Cited

U.S. PATENT DOCUMENTS

| | | | | |
|---|---|---|---|---|
| 6,161,066 A | * | 12/2000 | Wright ................. | B60Q 1/2611 340/468 |
| 2002/0175830 A1 | * | 11/2002 | Hudson ................ | G08G 1/0955 340/907 |
| 2005/0243171 A1 | * | 11/2005 | Ross ..................... | B60R 25/302 348/148 |
| 2006/0175774 A1 | * | 8/2006 | Garcia ................. | B62D 63/064 280/1 |
| 2008/0192120 A1 | * | 8/2008 | Corley .................. | H04N 7/183 348/188 |
| 2009/0152833 A1 | * | 6/2009 | Johnson ............... | B60Q 1/2611 280/504 |

\* cited by examiner

*Primary Examiner* — Dave Czekaj
*Assistant Examiner* — Tsion B Owens

(57) ABSTRACT

An apparatus for deploying test images for a preset period within the field of view of a camera, and having; a panel supporting the test image, and moveable transmission connected with the panel and operable to deploy, and retrieve, the panel.

6 Claims, 2 Drawing Sheets

POP-UP TEST REFERENCE IMAGE

FIELD OF THE INVENTION

This application claims priority of the filing date of U.S. Provisional application Ser. No. 61/689,848 filed Jun. 14, 2012; Inventor: Ferrand D. E. Corley; Title: Pop-Up Test Reference Image. The invention relates to an apparatus'and method for deploying a precision test reference image within the field of view of a camera to assist in optimizing image reproduction accuracy in still and motion digital imaging applications.

BACKGROUND Of THE INVENTION

Under ideal exterior and studio and lighting conditions, shooting a precision test pattern in front of the camera before or after scene, is known to assist in achieving a high level of reproduction accuracy. However, there are an increasing number of applications and shooting conditions where including a test pattern in the scene is difficult. For example an officer pursuing a suspect in a police cruiser with a dashboard camera running, has more important issues than remembering to place a test chart in front of the camera. Secondly, a test pattern remaining in the field of view of a camera, for more than the length of time required to provide a useful reference, could obscure important information.

Thirdly, constantly exposed test elements in the pattern would be subject to damage and rendered useless by adverse weather conditions.

BRIEF SUMMARY OF THE INVENTION

The invention provides an apparatus for use in optimizing reproduction accuracy of images, recorded for example under difficult or adverse conditions and comprises a movable panel, mountable on a vehicle for example, and which provides black, white, gray and colour test elements designed to produce predetermined electronic signals in electronic imaging systems when the test elements are being accurately reproduced, and which, when not in use can be stored within the apparatus and which can be deployed within the field of view of a camera, either at an operator's command, or automatically, such as when a car door opens, or the camera is activated.

Preferably, the invention further provides such an apparatus wherein there is a housing provided in which the panel can be stored, and from which it can be deployed, and the housing being mountable on a portion of, for example, a vehicle.

Preferably, the invention will provide such an apparatus wherein light is incorporated, which can be operated to illuminate the test pattern on the panel, when the camera is in operation.

Preferably the housing and apparatus can be mounted on the hood of a vehicle, in front of the windshield, and wherein the camera and light may be mounted inside the vehicle behind the windshield.

The various features of novelty which characterize the invention are pointed out with more particularity in the claims annexed to and forming a part of this disclosure.

For a better understanding of the invention, its operating advantages and specific objects attained by its use, reference should be made to the accompanying drawings and descriptive matter in which there are illustrated and described preferred embodiments of the invention.

IN THE DRAWINGS

FIG. 1 is a camera view of one embodiment of the apparatus with test elements stored;

FIG. 2—is a front camera view of one embodiment of the apparatus with test elements deployed;

DESCRIPTION OF A SPECIFIC EMBODIMENT

Figure 1:
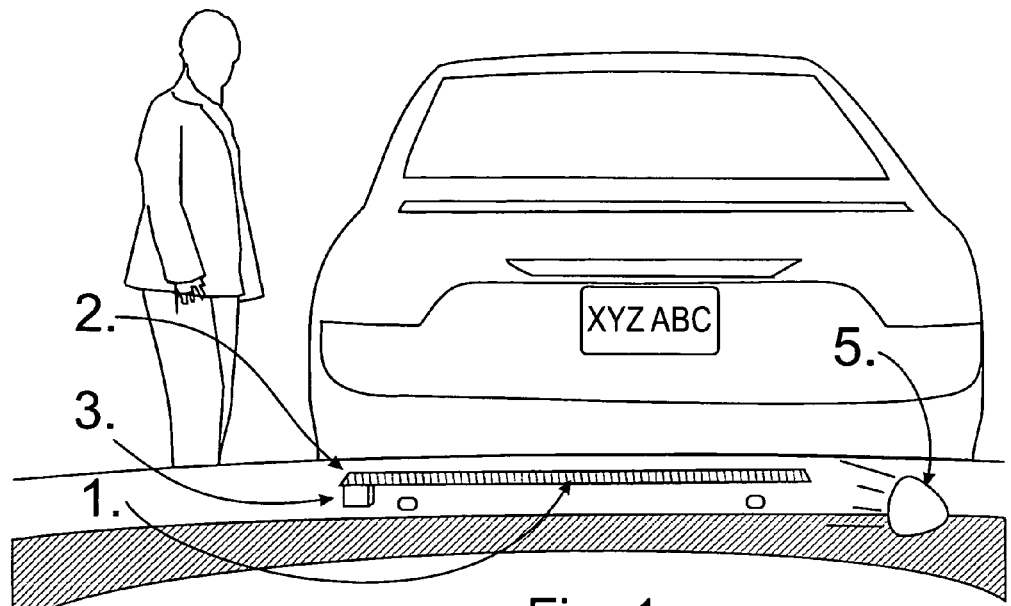
Figure 2:
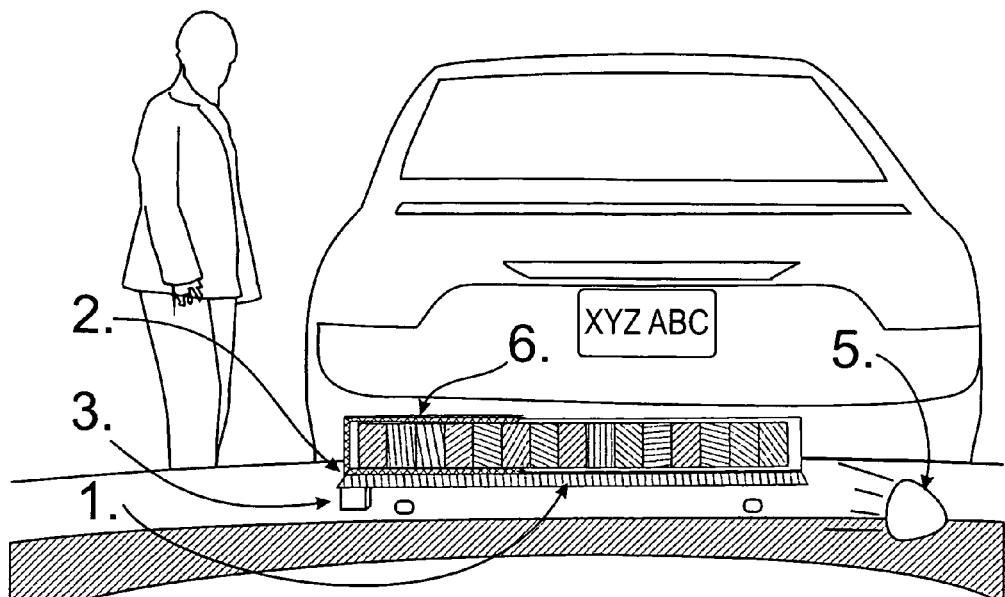
Figure 3:
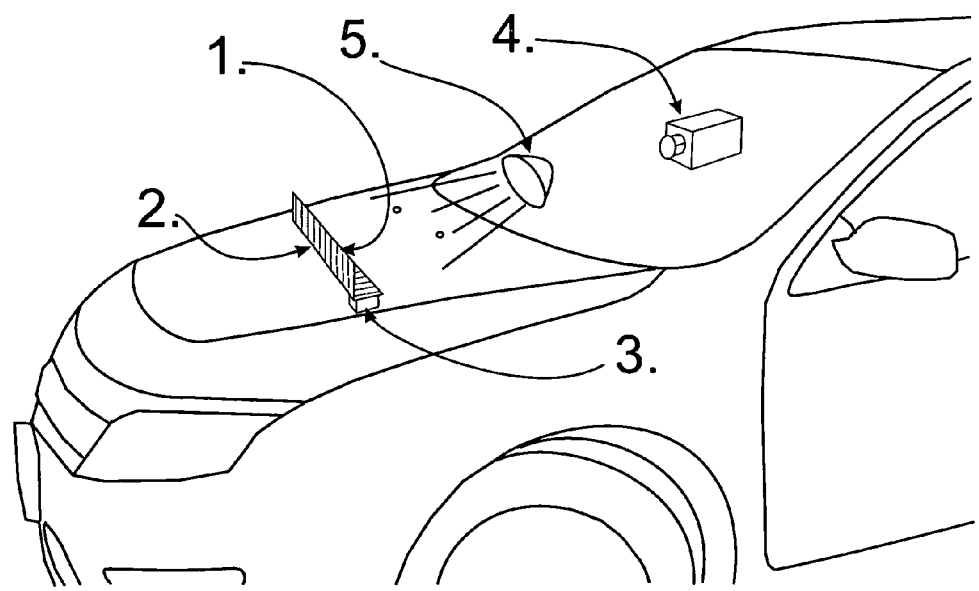
FIG. 3 is a side view of the apparatus with test elements deployed.
Figure 4:
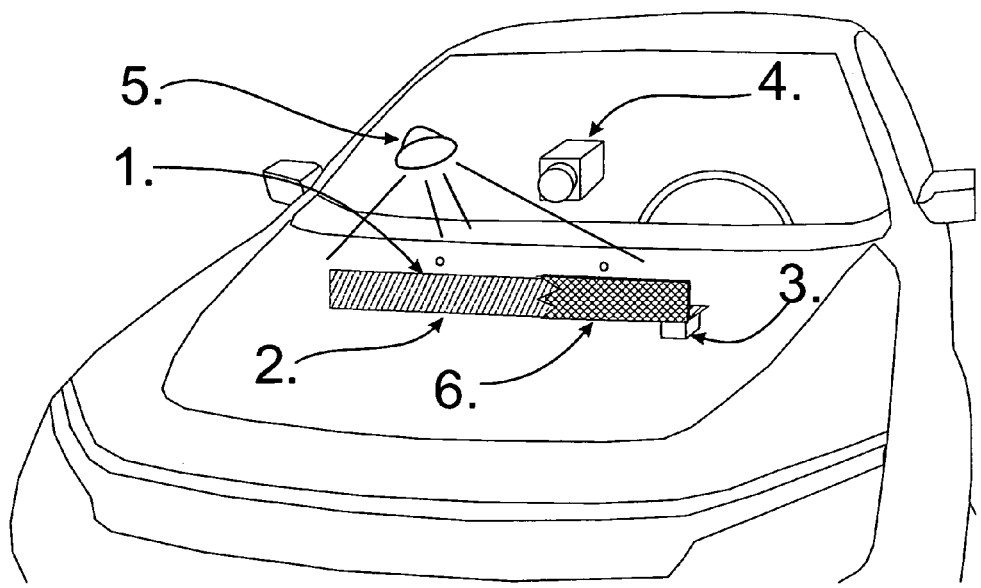
FIG. 4 is a rear view of the apparatus with test elements deployed.

Referring to FIGS. 1-4, an element support panel 1, carries element reproductions of grayscale and colour test images. The panel is attached to a hinged support 2 in a housing which may be opened or closed remotely by activator 3 employing electrical or pneumatic mechanisms well known to the trade.

The housing can be mounted for example on the hood of a vehicle, and the panel is normally located within the housing protected from the elements. Camera 4 (FIGS. 3 & 4) records the elements on panel 1 along with the scene. The camera would normally be located within the vehicle, for security and protection from the elements. Light 5 (FIGS. 3 & 4), positioned inside or outside the vehicle may be used when necessary to illuminate the elements at night.

When photographs are taken with the camera, the test images will appear alongside the actual scene being photographed. Data from the test images in the recorded image is then used as a reference to adjust the brightness, contrast and colour characteristics of the image resulting in greater accuracy in the reproduction of the scene. The Panel 1 is housed in closed housing 6, protected from the elements. On receipt of a signal from an operator or an automatic command, such as a police officer opening the car door to approach a suspect, the apparatus deploys placing the test images within the camera's field of view for a preset period of time.

The Panel and test images are designed to be easily removed from the housing so that they may be sent, along with the video footage or still camera images, to a forensic laboratory for analysis.

Additional Embodiments

1. The grayscale and colour test images may include unique coded identification to reduce the possibility of pattern misidentification.
2. In some situations it may be more convenient and to reduce wind resistance, particularly in aircraft applications, for the panel and test images to be raised and lowered through a slot in the apparatus or vehicle housing.
3. For night time use, a light 5 having the same spectral characteristics as the car headlights and adjusted to a similar brightness as the light illuminating the suspect's car may be used to illuminate the chart.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An apparatus for optimizing image quality of images recorded by a vehicle mounted camera, the camera being mounted inside the vehicle driving compartment, and being operable to create images around the exterior of the vehicle and comprising;
   a test image support panel mounted on the exterior of said vehicle outside said driving compartment;
   a test image on said support panel, viewable by said camera from within said vehicle driving compartment;
   a moveable mounting supporting said support panel on said vehicle exterior;

a moveable housing for enclosing said support panel in a stored position, and, a movement control within said vehicle driving compartment, for operating said moveable housing and said support panel whereby to deploy said support panel with said test image viewable by said camera from within said vehicle, whereby the camera may record images around the exterior of the vehicle and simultaneously record images of said test image.

2. The apparatus as claimed in claim 1 including a light, mounted inside said vehicle driving compartment operable to illuminate the test image on the support panel.

3. The apparatus as claimed in claim 2 wherein the light brightness may be varied, to match the illumination from headlights on the vehicle.

4. The apparatus as claimed in claim 3 wherein the moveable housing and support panel are mounted on the hood of the vehicle, and wherein the camera and light are mounted within the driving compartment of the vehicle.

5. The apparatus is claimed in claim 3, wherein the vehicle has a windshield and wherein the camera and light are mounted within the driving compartment directed through said windshield, and wherein the support panel is mounted outside the driving compartment on the hood of the vehicle, with the support panel located in the field of view of the camera.

6. The apparatus is claimed in claim 5, and wherein said test image support panel is removably mount in said moveable mounting, whereby the test panel may be removed, for optimization of the camera image.

* * * * *